N. W. BANCROFT.
Self-Acting Spinning-Mules.
No. 147,590. Patented Feb. 17, 1874.

6 Sheets--Sheet 3.

AM. PHOTO-LITHOGRAPHIC CO. N.Y. (OSBORNE'S PROCESS)

6 Sheets--Sheet 4.

N. W. BANCROFT.
Self-Acting Spinning-Mules.

No. 147,590. Patented Feb. 17, 1874.

Witnesses
Will Antrim
D. G. Stuart

Inventor.
Nathan W. Bancroft
per P. Hannay
Atty.

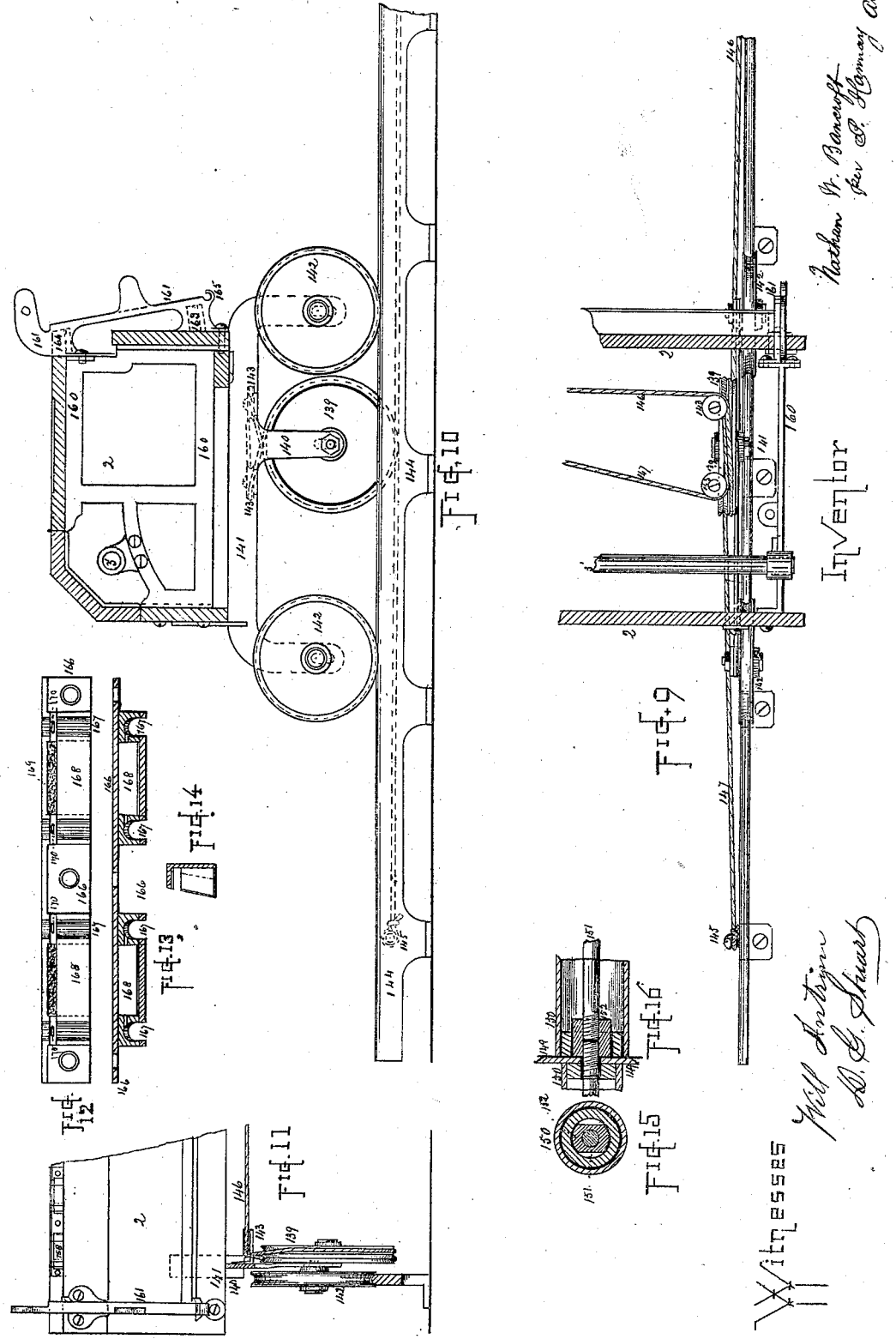

N. W. BANCROFT.
Self-Acting Spinning-Mules.
No. 147,590. Patented Feb. 17, 1874.
6 Sheets--Sheet 6.
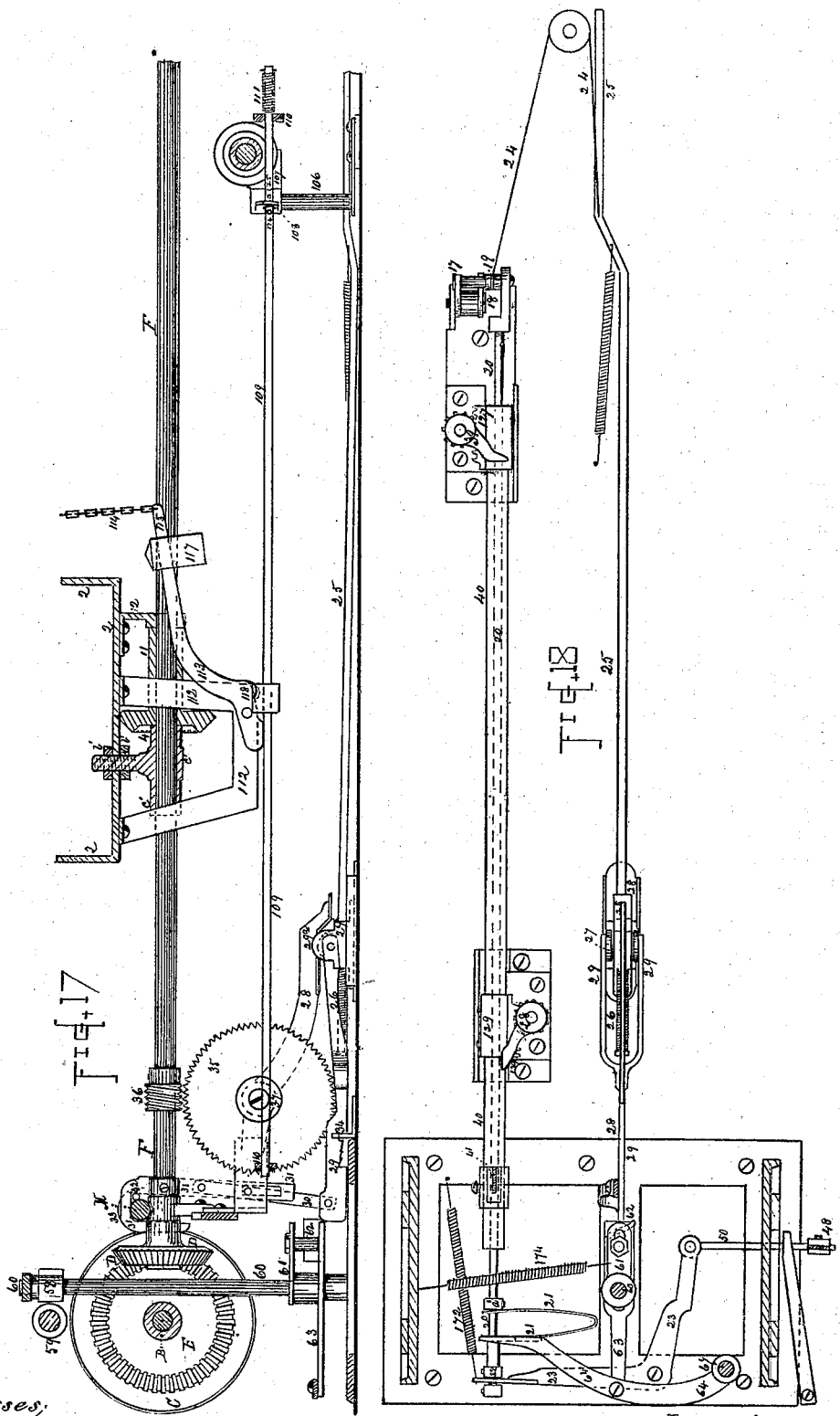
Witnesses:
Will Arthur
D. G. Shuart
Inventor,
Nathan W. Bancroft
per P. Hannay
atty
AM. PHOTO-LITHOGRAPHIC CO. N.Y. (OSBORNE'S PROCESS)

UNITED STATES PATENT OFFICE.

NATHAN W. BANCROFT, OF WORCESTER, MASSACHUSETTS.

IMPROVEMENT IN SELF-ACTING SPINNING-MULES.

Specification forming part of Letters Patent No. 147,590, dated February 17, 1874; application filed October 18, 1873.

*To all whom it may concern:*

Be it known that I, NATHAN W. BANCROFT, of Worcester, in the county of Worcester and State of Massachusetts, have invented certain Improvements in Automatic Spinners, of which the following is a specification, reference being had to the accompanying drawings, in which—

Figure 1:
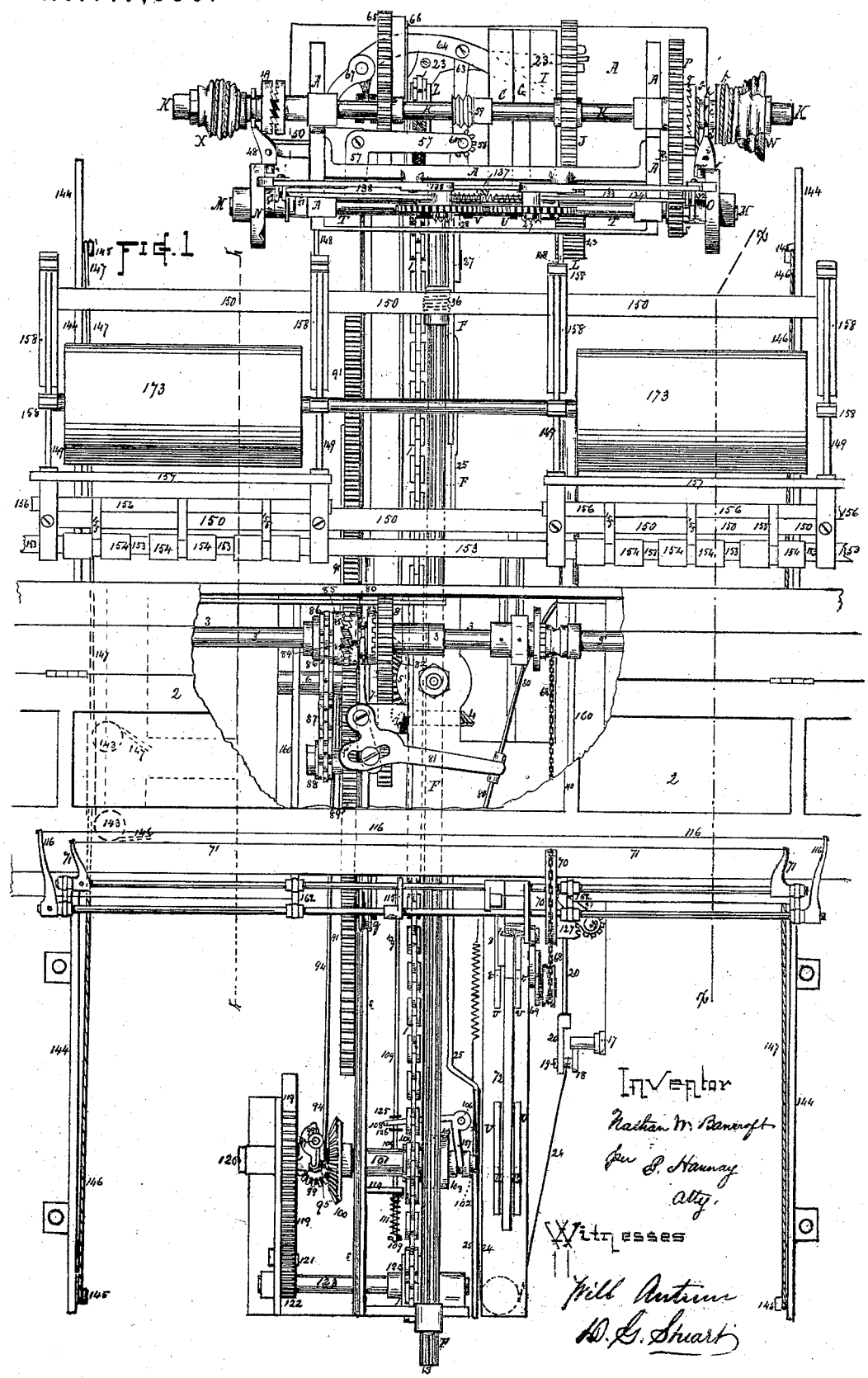
Figure 2:
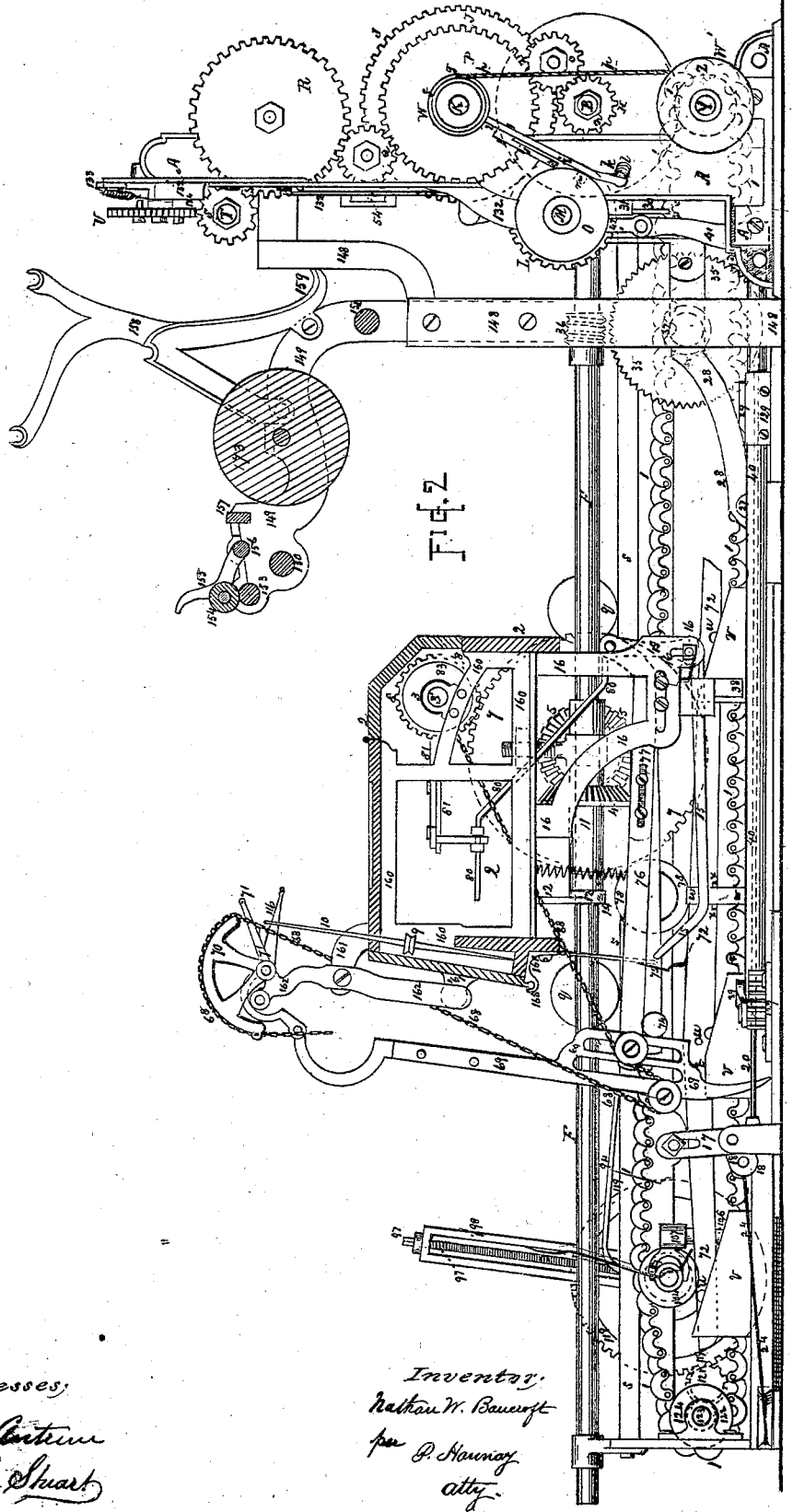
Figure 3:
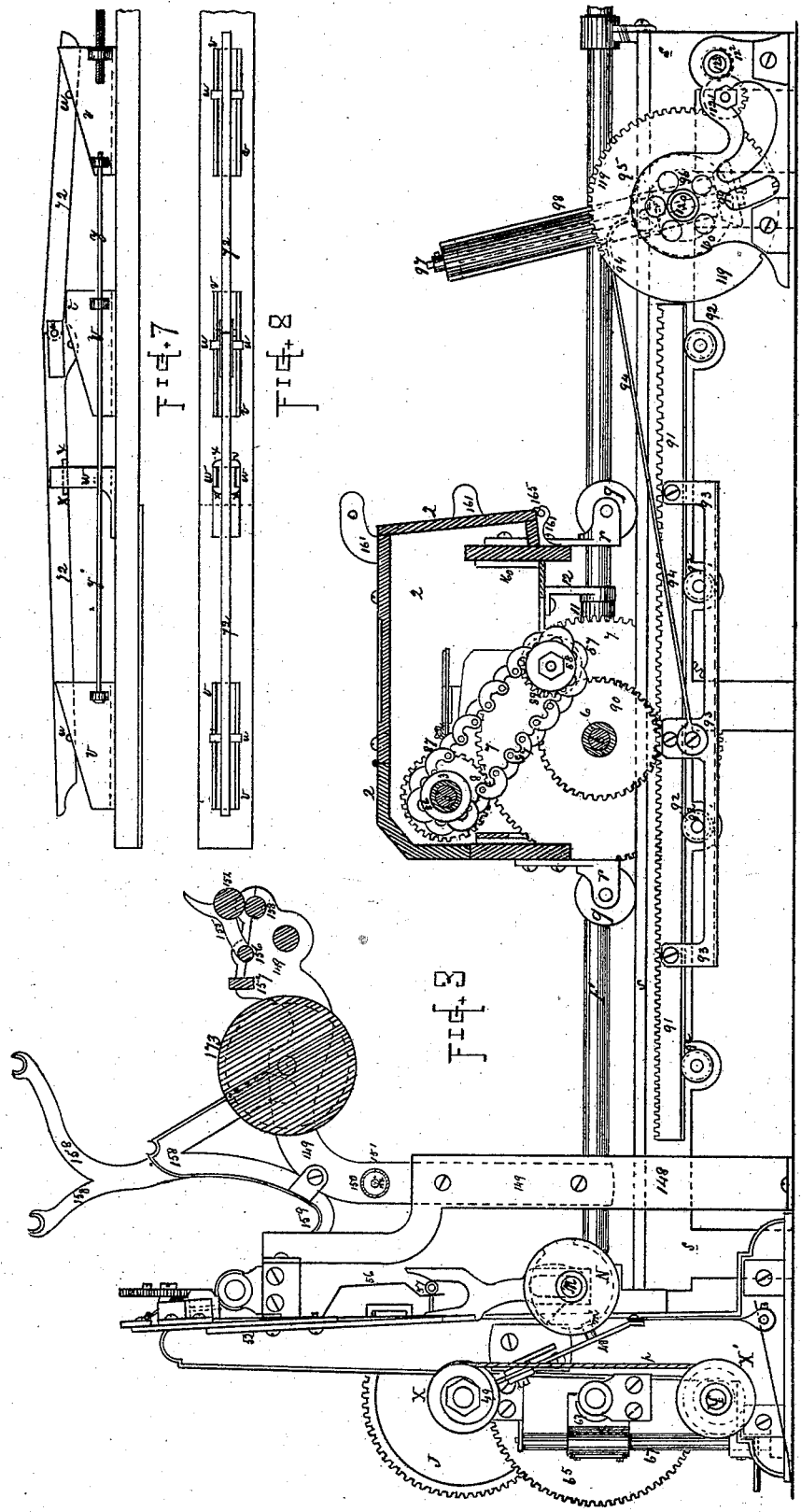
Figure 4:
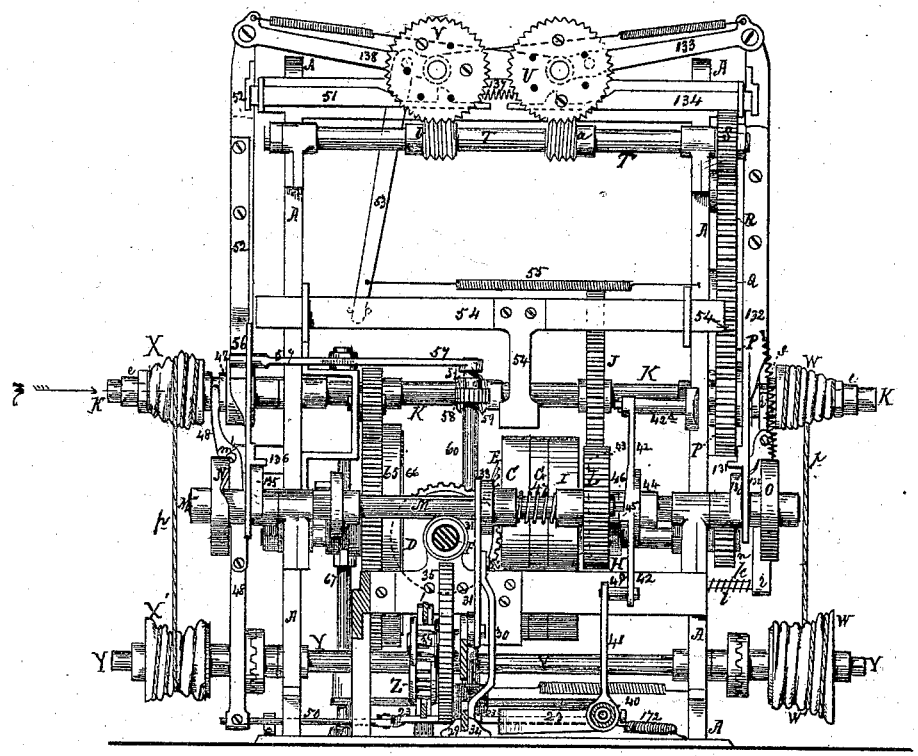
Figure 5:
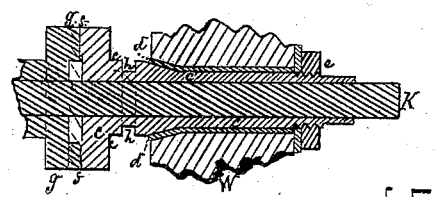
Figure 6:
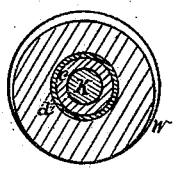

Figure 1 represents a plan of a machine embodying my improvement, a portion of the upper side of the carriage being broken away to show the mechanism of the interior. Fig. 2 represents a vertical section taken through the line $x\ x$ of Fig. 1. Fig. 3 represents a vertical section at view taken through the line $y\ y$ of Fig. 1, on the other side of the machine; and Fig. 4 a vertical transverse section with the roving-frame removed, in order to show the head-stock and the peculiar arrangement of the actuating mechanism. Fig. 5 represents a detached view, in section, of the drawing in and out scrolls, to show the method of securing the same to their sleeves; and Fig. 6 a transverse sectional view of the same. Fig. 7 represents a side elevation, and Fig. 8 a plan, of the builder frame and rail. Fig. 9 represents a plan of the squaring-band and carrier-pulleys, together with the supporting-wheels of the carriage, they being detached from the machine; Fig. 10, a side elevation of the same as attached to the carriage; and Fig. 11, a front elevation of Figs. 9 and 10. Fig. 12 represents the self-lubricating bolster for the spindles; Fig. 13, a plan, and Fig. 14 an end, view of the same. Fig. 15 represents a cross-section, and Fig. 16 a longitudinal section, of a portion of two sections of the roving-frame, connecting-tubes, and of one of the "samson" frames, the latter being broken off in order to show the mode of coupling them together. Fig. 17 represents a detached view, in elevation, of the devices for easing up the carriage when the twist is being thrown into the yarn, and also shows the devices for throwing the saw-clutch gear into gear with the clutch-gear that operates the screw in the quadrant. Fig. 18 represents a plan of the main shipping-rod and its connecting devices, and also a portion of the easing-up devices, the builder-frame being removed from between them.

My invention relates, first, to a new and improved construction and arrangement of the actuating devices of the machine; and consists in driving the spindle-drum by means of a gear-wheel made fast to the driving-shaft, and a corresponding gear made fast to a shaft, which I term a "race-shaft," and on which is mounted a sliding gear, which meshes into a corresponding pinion made fast to the shaft of the gear-wheel that actuates the spindle-drum, and using in connection therewith certain new and improved means for drawing the carriage in and out, whereby a regular and positive movement is imparted to the spindles, thereby obviating the many difficulties incident to the use of a race-belt, which, unless provided with suitable devices to retain the carriage in position when the belt is reversed for backing off, would force the carriage out too suddenly and draw it in before the backing-off operation is completed. It also supersedes the necessity of using automatic devices for releasing the dog when that operation is completed; and, beyond all, imparts a more even and equal motion both to the carriage and spindles. My invention further relates to the special devices for drawing the carriage in and out. Heretofore but one scroll was used for dragging the carriage out and one for drawing it in. My improvement consists in the use of two reverse scrolls for each of these operations, whereby I am enabled to impart both motions in a more equal and uniform manner to the carriage through the same chain and spur-wheels. It also relates to a new means for operating the carriage; and consists in the combination, with the main driving-shaft and carriage, of two shafts to carry the two sets of drawing-scrolls and a chain with gears suitably arranged for drawing the carriage in and out, there being a double system of gears so arranged on and in connection with said shafts as to effect these objects in a manner hereafter to be described, and by means of which a more even and regulated motion is imparted to the carriage than has been heretofore attained. The combination and arrangement of these latter also form a part of my present improvement. My invention also relates to a new and improved mode of mounting the scrolls upon their shafts, and which consists in mounting them each upon a sleeve made slightly conical at its inner end, through the interposition of a leather packing, and then securing them on their shafts by means of a screw-nut, by means of which, in case of accident or undue strain upon them, they are allowed to slip, thus avoiding breaking or derangement of the machinery. It also consists in a new and improved means for actuating the roving-gear with relation to the delivery-roll. Also, in a new means for actuating a gear for regulating the amount of twist to be thrown in. My invention further relates to a new and improved means for operating the devices that allow the drawing-in scrolls to be thrown in and out of gear; and it consists in combining a cam, arranged on the under side of the carriage-frame, and a couple of tappet-pinions secured to the bed-frame of the machine, so arranged as to mesh with the teeth of a couple of short rack-bars, made fast to a hollow slide-rod, in the rear end of which is secured a standard, on the upper end of which is pivoted one end of a lever, the other end of which is pivoted to the frame of the head-stock. This lever is provided at or near its center with a curved slot, through which passes the shaft that carries the cams which operate the shipper-forks that throw the saw-clutch gears of the scrolls in and out of gear, so that when the slide-rod has been drawn back by the action of the carriage, as it reaches the end of its stretch, it will have drawn the lower end of the slotted lever forward, and, in so doing, released the catch-pin on the face of the male friction-cone, which is secured to the cam-shaft, thereby allowing the latter to make a half-revolution, and, in so doing, carrying the depression in the cam that allows the clutch of the drawing-out scroll to remain in gear around with it, and, by that act, forcing the clutch out of gear, thus stopping the further outward motion of the carriage. The same act causes the cam that actuates the clutch-pinion of the drawing-in scroll also to perform a half-revolution, thereby bringing the depression in its edge in position ready to receive the pin of the shipper-fork of that scroll. By this arrangement the clutch of the latter can be thrown into gear as soon as the backing-off process is completed. Both scrolls, from the time that the outward stretch of the carriage has been completed, are, through suitable devices, also forming a part of this improvement, held out of gear until the final twist has been thrown in and the backing-off operation completed. My next improvement relates to a new and improved means for easing up the carriage while the final twist is being thrown into the thread or yarn, whereby a regular and uniform motion is imparted, as well to the spindles as to the carriage, during that operation; and it consists in combining with the main shipper-rod a system of levers, so arranged that while one shall hold the clutch of the drawing-in scroll out of gear the other shall raise the bearings of a gear-wheel in such manner as to cause it to mesh with an endless screw-gear mounted on the race-shaft, so that the same shaft that drives the spindle-drum, in order to throw the twist in, shall, at the same time, through a pinion mounted on the same shaft as the gear-wheel, and meshing with the chain that operates the carriage, slowly drag the carriage in with a speed proportioned to the shortening of the stretch as the thread or yarn receives its final twist, and this until that operation has been completed and terminated by the action of the twist-gear that regulates the duration of that operation. My invention also relates to a new and improved means for reversing the motion of the spindles, in order to perform what is technically called the backing-off operation; and it consists in a new arrangement and combination of devices to be used in connection with the race-shaft, whereby that operation is performed in a simpler and more positive manner than heretofore. My invention further relates to a new and improved arrangement and combination of devices for releasing the stop devices that hold the drawing-in scroll out of gear with its actuating shaft, when the backing-off operation has been completed; and for forcing it into gear, in order to cause it, through the backward drag of the carriage, to wind up the thread or yarn on the cops or bobbins. The next improvement consists in a new and improved means for throwing the devices which drive the spindles, during the process of winding the yarn on the cops, into gear with the devices that actuate the same on the completion of the backing-off operation. The latter devices, combined with the winding devices, also form a part of this branch of my improvement; and through which I am enabled to give a positive movement to the spindles throughout the whole process of winding the yarn, and that in such manner as to give to the same a motion regulated according to the slightest change in the compensating devices. My improvement further relates to a new and improved mode of constructing, adjusting, and operating the compensating devices, commonly called the quadrant movement, which regulate the motion of the spindles during the winding of the yarn on the bobbins, by means of which I am enabled to impart a positive motion to the same, and to dispense with the quadrant-chain, and thereby wind the yarn in a more even and regular manner that has been heretofore practicable, and that for the reason that the movements, in all the devices used by me for performing this operation, are at once positive, and derived from the same source—that is to say, from the chain that drags the carriage back and forth. My improvements further relate to a new and improved means for building the yarn or thread on the bobbins or cops, whereby I am enabled to simplify the operation and to dispense with many of the complicated devices heretofore in use. This improvement consists in combining, with the faller-lock latch, a pivoted lever, for operating the same in connection with a jointed builder-rail having vertical but not endwise motion, and which is mounted on a system of three inclined planes having end motion, the middle one of which, on the top, terminates in a horizontal plane, while the two outer ones are provided with a single incline from one end to the other, the inclined faces of all three being at the same angle to a horizontal plane. All three are to be, in practice, connected together, so that, when moved for the purpose of adjusting the rail, they move in unison, and through the same increment of space, and are so moved (and that for a regulated distance) at the end of each outward stretch of the carriage. My improvement further consists in a new and improved arrangement of devices that guide the squaring-band of the carriage, by means of which the latter is removed entirely out of the way of the operators, thereby enabling them to move with greater facility than heretofore about the machine, in attending to the strands of roving or yarn, should either require attention. My invention also consists in a new and improved construction and arrangement of the spindle-step rails, whereby they are made removable in sections, in order to enable the operators readily to get at the steps should any derangement occur, as is frequently the case. My improvement further consists in a new and improved construction of the frame-work of the carriage, whereby the latter and its operative mechanism can be readily taken apart in sections for convenience in transportation, and afterward put together again, and by which the carriage may be made to carry any required number of sections of spindles, as each section is made complete in itself and in all its working parts. My improvement further consists in a new and improved construction of the frame that supports the roving-delivery mechanism, whereby it, like the carriage, can be readily taken apart in sections, for convenience of transportation, and put together again, and whereby (each section being made complete in all its parts) the frame can be extended or diminished at will, in order to increase or decrease the capacity of the machine. My improvement also consists in a new and improved construction and arrangement of the roving-delivery rolls, whereby one of the two under delivery-rolls is dispensed with, and the upper one made more convenient for handling by the operators while piecing the roving, while it prevents all displacement of the top rolls; and, lastly, my improvement consists in a new and improved construction of the back stands of the roving-frame, whereby additional facilities are provided for the support of empty spools, and which has proven to be a great advantage and convenience to the operator.

To enable others skilled in the art to make, construct, and use my improvement, I will now proceed to describe its parts, and their relation to each other, in detail.

On the frame or head-stock A, in suitable bearings, is mounted the counter-shaft that drives the main shaft B through the driving-pulley C. On the side face of the pulley C is formed or otherwise secured a bevel-gear, E, which meshes with a corresponding pinion, D, secured to the race-shaft F that drives the drum 3 and spindles 10. On the main shaft B is mounted a loose pulley, G, by means of a hollow sleeve, to which it is made fast at one end, and which carries a pinion, H, at the other. Between this pinion and the pulley G is loosely mounted on the sleeve which connects the two together a loose pulley, I. The pinion H is made to mesh with a gear-wheel, J, secured to the shaft K that carries the upper scrolls. The gear J, in turn, meshes with another pinion, L, mounted on the shaft M that turns the cams N and O, which throw the scrolls in and out of gear. Upon the shaft K is loosely mounted another gear-wheel, P, which is made to mesh on the one side with a small transmitting-pinion, Q, mounted on a stud-pin secured to the frame of the machine, and on the other side with another transmitting-pinion, $o$, also mounted on a stud-pin on the frame. The pinion Q meshes, in turn, with gear-wheel R, which, in turn, drives the pinion S, keyed fast to the shaft T that operates the roving and twist gears U and V through the instrumentality of endless-screw gears $a$ and $b$, keyed fast to said shaft T, and in such manner as to operate these gears in reverse directions. Upon each end of the shaft K is mounted, by means of a sleeve, $c$, a scroll, the one, W, being the drawing-out, and the one, X, the drawing-in, scroll of the carriage. These scrolls are mounted upon the sleeve in such manner that, on any sudden jerk or force being exerted upon them, or anything interfering with the inward or outward run of the carriage, they will turn upon their sleeve $c$, and yet, under the ordinary working strain of the machine, be held firmly in place to perform their alloted task. This result I accomplish by interposing a leather packing, $d$, between the scroll and sleeve.

In order to secure the scroll and packing firmly to the sleeve $c$, the inner end of the hollow part of the scroll is made conical, as is the corresponding part of the sleeve, so that the scroll being put in position on the sleeve, the friction required to perform its work is regulated by means of a screw-nut, $e$, working on a screw-thread cut on the end of the sleeve $c$, which, forcing the scroll up the incline of the sleeve, regulates the frictional pressure required to enable the scrolls to perform their work. The inner end of the sleeve $c$ carries a clutch, $f$, which is intended to mesh with a corresponding clutch-gear, $g$, formed on, or otherwise secured to, the face of the gear P. Between the clutch $f$ and the scroll W, in the sleeve $c$, is formed a depression, $h$, for the reception of the forked ends of a lever, $i$, pivoted to a standard, $j$, formed on, or otherwise secured to, the frame of the head-stock. The lower end of this lever is pivoted to a slide-rod, $k$, which carries a small spiral spring, $l$, so constructed and arranged as to force the lower end of the lever $i$ outward, and acts as the direct means of throwing the clutch-gear $f$ into gear with the clutch-gear $g$ on gear P—in other words, is the means of throwing the drawing-out scroll into gear with the machinery which actuates it when the proper time arrives. This is effected in the following manner: On the inner face of the lever $i$, and near its lower end, is secured a stud-pin, $m$, against the face of which the edge of the rim of the cam O bears. The rim of the cam O is provided with a depression, which, when the cam has been turned around until this depression is opposite the pin of the lever $i$, allows the spring $l$ to force the lower end of the lever $i$ outward, the pin $m$ descending and passing into the depression in cam O, thereby forcing the upper end of the lever $i$ inward, and, by that means, throwing the scroll-clutch into gear. The other scroll, X, is mounted on shaft K in a similar manner.

The scroll W, thrown into gear as just described, receives motion from the main driving-shaft through the pinion $n$, which is keyed fast to the same, and transmitting-gear $o$, which, meshing on the one side with the pinion $n$, and on the other with the gear-wheel P, as before stated, imparts, through the clutch-gear $g$, motion to the drawing-out scroll W through the clutch-gear $f$ on the sleeve $e$, on which the latter is mounted.

Motion being imparted to the machine, and the driving-belt having been thrown on main driving-pulley C, the carriage will commence moving outward through the action of the pinions $n$ and $o$, gear-wheel P and clutches $g$ $f$ acting on the scroll W, which, in turn, acting on the counter-scroll W' by means of the cord or chain $p$, turns the shaft Y, on which it is mounted, and which also carries the sprocket-wheel Z that imparts motion to the chain 1. The carriage 2 being now gradually moved outward in the manner described, motion is imparted to the roving-machinery in the usual manner, by a system of gearing arranged on the roving-frame and the roving-delivery roll, and which are actuated by a gear-wheel mounted on the shaft T, that controls the roving and twist gears, the shaft T deriving its motion from the main driving-shaft, through pinions S, R, Q, P, $o$, and $n$, the latter being fast to the driving-shaft B. Simultaneously with this movement, motion is imparted to the spindle-drum 3 by means of the bevel-gear E on the face of the driving-pulley C, through the corresponding bevel-pinion D, made fast to the race-shaft F, on the rear end of which is mounted a sliding or traveling gear, 4, which, meshing into a corresponding pinion, 5, mounted on a shaft, 6, running in suitable bearings arranged on the frame of the carriage, drives the latter; and, as on the same shaft 6 is secured a large gear-wheel, 7, the teeth of which are made to mesh with the drum-gear 8, motion is thereby imparted, as before stated, to the spindle-drum. From this drum 3 a band is made to pass to the whirl 9 on each spindle-shaft, in this way imparting motion to the spindles 10.

Reverting again to the sliding gear 4, by reference to Fig. 2 it will be seen that it is secured to one end of a hollow sleeve, 11, which is loosely mounted on the race-shaft F, the other end being provided with a standard, 12, made fast to the under side of the front part of the carriage, so that the motion of the carriage, either out or in, will carry the sliding gear 4 back and forth with it.

In order to impart rotary motion to this gear 4 through the race-shaft and yet leave it free to slide back and forth, a longitudinal groove, 13, is cut in the race-shaft, and a corresponding groove on the inside of the sleeve of gear 4, into which is fitted a spline of a length equal to that of the sleeve.

Immediately in the rear of the sliding gear, to the bottom of the carriage 2, is secured a hanger, $c'$, on the lower end of which is formed a bearing or support for the race-shaft, and which is made adjustable by means of two nuts, $b'$, the one arranged above, and the other below the bottom of the carriage, the object of which is to adjust and maintain the shaft in its proper horizontal position.

By means of these devices, operating as described, the roving is delivered and the carriage moved outward with a speed equal to the delivery of the roving, and is twisted sufficiently to impart the necessary strength to the roving to admit of its being drawn out to the degree of fineness required, and which is effected, and the final twist thrown in, in the manner hereinafter to be described.

The spinning process and delivery of the roving, above referred to, are continued until the carriage has been drawn half-way out, or thereabout, according to the quality of the staple being spun, a good quality admitting of being drawn to a greater length than a poorer quality, and which will require, and will hereafter be referred to, a corresponding change to be made in the drawing-out scrolls.

Assuming, therefore, the scrolls to have been properly adjusted, and the carriage to have been drawn out as far as is required before stopping the delivery of the roving, the following changes in the machine and operations will be performed automatically as soon as that point has been reached: In the first place, the gear on the shaft T, which, through the train of gears before referred to, imparts motion to the roll that delivers the roving from the spools to the spindles, is thrown out of gear, in the usual manner, by the action of the roving-gear U, thus stopping the further delivery of the roving to the spindles. At the time the roving has been stopped, the cord or chain $p$ will have reached the conical or diametrically-decreasing part of the groove in the upper scroll W, and the inclined or diametrically-increasing part of the counter-scroll W', so that, while the motion of the spindles remains constant, the motion of the carriage outward becomes gradually slower and slower until it has reached the outer end of its stretch. In doing this an angle-lever, 15, pivoted at its angle to a hanger, 16, attached to the under side of the carriage, has gradually depressed a crank-lever, 17, on the shaft of which is secured another crank-lever, 18, on the wrist-pin 19 of which is mounted the end of the main shipping-rod 20, throwing the latter forward, and by that act compressing an U-shaped spring, 21, between the end of lever 64, and a collar, $a'$, made fast to the shipping-rod, and at the same time a collar, 22, also made fast to that end of the shipper 20, is made to abut against the inner face of the crank-lever 23, for a purpose to be hereafter described.

While these changes have been going on, a cord or chain, 24, attached at one end to the wrist-pin 19 of crank 18 that operates the shipper-rod 20, and at the other end to the easing-up rod 25, has, by this forward movement of the main shipper 20 toward the head-stock, dragged the easing-up rod 25 backward, and in so doing has compressed the spiral spring 26, which is mounted on its other end between a head or nut fastened to that end of the rod and the head-rest 27 of a small friction-roll that actuates the easing-up lever 28. The head-rest 27 of the friction-roll consists of a slide having standards in which the shaft of the friction-roll is mounted, and carries a forked latch-piece, 29, the forked end of which is pivoted to the shaft of the friction-roll $29^a$, while the other is pivoted to the lower end of a lift-rod, 30, whose other end is pivoted to the side of a hooked lever, 31, the hooked end of which hangs on the cam-shaft M, and is raised by the action of a cam-pin, 32, fastened on the face of the collar 33 on cam-shaft M. The hook 31 is raised once for every revolution of the cam-shaft M, and on being raised releases the forked latch 29 from the catch-pin 34, made fast to the bed of the frame. A notch is cut on the under side of the latch 29, in order to engage with this pin 34, so that the spiral spring 26, being compressed, and the latch released by the raising of hook 31, as above described, the recoil of the spring will force the friction-roll $29^a$ of head-rest 27 under the inclined end of the easing-up lever 28, thereby raising the worm-gear wheel 35 and causing it to mesh with the screw-gear 36 on the race-shaft F. Through these means, and a chain-gear, 37, (see Figs. 2 and 17,) made fast to the shaft of the worm-gear 35, motion is imparted to the chain 1 that operates the carriage.

By this means the same shaft F, which, through the drum, imparts motion to the spindles, is made the means of drawing the carriage back, in order to compensate for the shortening of the yarn in the throwing in of the twist.

But, before the easing-up devices have been thrown into gear, as just described, other devices have been operated and changes taken place, which I will now proceed to describe.

In moving the carriage back, a small stud or cam, 38, forming part of the hanger 16 of the lower part of the frame of the carriage, is made to act upon a tappet formed on the side of a rack-pinion, 39, whose teeth engage with those of a rack-bar, 127, formed on or otherwise secured to the side of the hollow shipper-rod 40, which forces the latter forward away from the head-stock, and in so doing dragging with it an arm, 41, which is secured to its rear end. The upper end of this arm carries a wrist-pin, $41^a$, on which is mounted the lower end of a lever, 42, whose other end is pivoted to an arm, $42^a$, secured to the frame of the machine or head-stock. This lever 42 is widened at or near its center, and is there provided with a horizontally-curved slot, through which the cam-shaft M passes. This lever is held in a vertical plane by the hub of the male friction-cone 43 on the one side, and a collar, 44, made fast to the shaft M on the other side. On the flattened part of the face of the slotted lever 42 are formed two circular cam-faces, each terminating in a full stop, 45. The inclines in each run in opposite directions, and are arranged on the opposite edges of the face of the lever. On the face of the male friction-cone 43, and a little at one side, is arranged a hollow hub, in which a pin, 46, plays, the one end of which is intended to bear against the inner face of the loose or slide gear-wheel L, which forms the female part of the friction-gears, while the other end rests or bears alternately against the inclined faces of the cams 45. Now, as the hollow shipper was drawn forward, as described, it dragged with it the arm 41, which, acting on the lower end of the slotted lever 42, drew that end forward, it being allowed so to do by virtue of the curved slot cut in its center; and in so doing withdrew the farther stop 45 from over the pin 46, thereby releasing it, and by so doing allowing the sliding gear L to be forced against the male friction-cone 43 by the action of the spiral spring 47, which is suitably arranged for this purpose on the cam-shaft M. This done, motion is then imparted to the cam-shaft through gear L and male friction-cone 43, causing the former to make a half-turn, thereby forcing the clutch of the drawing-out scroll out of gear by the action of the face of the cam O on the pin $m$ of the forked shipper $i$. This motion of the cam-shaft is then arrested by the pin 46 being arrested by the incline and stop 45 on the other edge of the lever 42, which act will have again thrown the main friction-cone out of gear. It is at this point that the forked latch-piece 29 has been released from the catch-pin 34, as the cam-pin 32 on the face of the collar 33 by the turning of the cam-shaft, will have raised the hook-lever 31 and lift-rod 30, to the end of which the latch-lever 29 is attached, thereby releasing the spiral spring 26, the recoil of which forces the friction-roll and head-rest 27 under the inclined face of the easing-up lever 28 in order to throw the worm-gear 35 into gear with the screw-gear 36 on the race-shaft F, and thus, as before stated, impart motion, through the chain 1 and chain-gear 37 on the shaft of the worm-wheel, to the carriage during the time that the final twist is being thrown into the yarn. Simultaneously with these operations the half-turn imparted to the camshaft M will have caused the cam N on its opposite end to have performed one-half of a revolution also, bringing its notch or depression opposite the pin $m'$, secured on the face of the shipper-fork 48, that operates the clutch 49 of the drawing-in scroll X, ready to allow the pin $m'$ to pass into the depression in the rim of the cam in order to throw the clutch into gear when the proper time arrives—that is to say, after the proper twist has been thrown in and the backing-off operation has been performed—but which it is prevented from doing until these operations have been performed by the action of the collar 22 on the end of the main shipper-rod 20, which, as before stated, had been made to abut against one end of the angle-lever 23, on the other end of which is secured the connecting-rod 50, the outer end of which is pivoted to the lower end of the shipper-fork 48, and, therefore, prevents the pin $m'$ of the shipper-fork from passing into the notch or depression of the cam N until the main shipper has been released, consequently, up to that time, holding both the drawing-out and drawing-in scrolls out of driving connection with the driving-shaft. These changes all having been made, the necessary twist is then thrown in, and the carriage gradually drawn back in order to compensate for the shortening of the yarn as it is being twisted. When the necessary amount of twist has been thrown in, and which is regulated by the twist-gear V, which, for this purpose, is made to operate in the usual manner by means of an adjustable screw-stop, and a series of screw-holes arranged at regular intervals apart, by the simple change of which any requisite degree of twist may be imparted to the yarn before releasing the lever that throws the backing-off gears into gear and the driving-belt off the main driving-pulley, and which I will now proceed to describe. The twist having been thrown in, and the spun yarn or thread being now ready to be wound upon the bobbins, the following operations and changes must be made. The stop-pin on the twist-gear V will now at this stage have withdrawn a latch, 51, from beneath a headrest on the twist-gear lifter 52, allowing the latter to drop, and in so doing, by means of an arm, 53, (see Fig. 4,) made fast to the pivotal axis of the lifter 52 and twist-gear lever 138, thrown the main belt by means of its slide-shipper 54 off from the main driving-pulley C onto the middle pulley G and loose pulley I through the traction of the spiral spring 55, it having at the same time, through the action of an inclined arm, 56, on the end of a pivoted angle-lever, 57, thrown the worm-pinion 58 into gear with the screw-gear 59 on the scroll-shaft K. Motion having now, through the shaft K, been imparted to the worm-pinion 58 on the upper end of the upright shaft 60, the latter, through an arm, 61, made fast to its lower end, and a pin, 62, secured thereto, acts on a cam-face formed on the end of a slide-lever, 63, the outer end of which is pivoted to the friction-lever 64, which throws the female friction part 65 into contact with the male friction-cone 66, which is fast to the main driving-shaft B, and which is effected by means of an upright shaft and shipper-fork, 67, on the lower end of which one end of the lever 64 is fastened, while the other end is slotted or forked, so as to embrace the end of the main shipper 20, and forms the one side or abutment, between which and the collar $a'$ the U-shaped spring 21 is compressed during the backward movement of the main shipping-rod, before referred to, when the carriage first reached the end of its outward stretch. The worm-pinion 58 having been thrown into gear with screw-gear 59, the arm 61 and pin 62 are caused to turn outward from the face of the cam on slide-lever 63, which being thus released allows the U-shaped spring 21 to force lever 64 outward, turning shaft 67, and with it the fork, which embraces the hub of female friction-gear 65, inward, thus forcing the latter in contact with the male friction-cone 66, and thereby reversing the motion of the driving-shaft B and race-shaft F in order to perform what is technically called the backing-off operation.

The slide-lever 63, in order to admit of the movement just referred to, is constructed with a slot in the line of its length, so as to embrace the worm-gear on shaft 60, which thus acts as a guide to the lever 63. A spring, 174, is secured at one end to the frame of the machine, and at the other to arm 61, so as to drag the latter back when pinion 58 is thrown out of gear with screw-gear 59 to reset lever 63, as when the operation first commenced.

By this peculiar arrangement and combination of devices a great improvement results over the method of performing the backing-off opertion by shipping the belt from the main driving-pulley to the reversing-pulley somewhat slowly, while the throwing of the friction-gears into contact with each other is performed suddenly, and before the driving-belt has had time to be fairly shipped from the one pulley to the other, thus bringing the friction-gears into full force and running order in the one direction, while the belt and driver with its gears are at the same time running in the other, thereby creating a violent straining of the machine, which oftentimes results in the destruction of the friction-gears. By my arrangement of devices time is given for the shipping of the belt from off the driver before the friction-gears have been fairly thrown into contact with each other. These changes having been made—that is to say, the belt thrown off the driver C—and the friction-gear 65 and male friction-cone 66 thrown into contact with each other, motion is imparted to the spindle-drum in a reverse direction, the motion of the driving-shaft and its gears being reversed. This unwinds the slant thread from the top of the spindles down to the top of the cone of the cop or bobbin, on which the yarn is being built, and is commonly called the backing-off operation. In doing this the faller-wire 71 has been drawn down into its proper position to commence the building of the cop in the usual way common to other machines of this class—that is to say, by means of a ratchet-wheel and self-acting dog mounted on the spindle drum-shaft 3′, to which is attached the one end of the faller-chain 68, the other end of which, after passing over the pulley of the faller-lock 69, is attached to the faller-quadrant pulley 70 in the usual manner, as shown in Fig. 2.

In drawing the faller 71 down to the position above referred to, the faller-lock 69, by the winding up of the chain 68, has been raised so as to bring its seat in a line with the plane of the builder-lever 75, which operates it. When raised to this position, a spring suitably arranged draws the lock inward with its seat immediately over a stud-pin, 74, secured to the side of the lever 75, and in so doing releases the crank-lever 17 of the main shipper 20 through the action of the adjustable lever 76 and the bar 77, which connects it with the upright end of the angle-lever 15, and which, during the forward movement of the carriage, had depressed the lever 17 that had previously thrown the main shipping-rod backward, in order to hold the drawing-in scroll out of gear, and to set the U-shaped spring 21, but which by this movement has now released the scroll shipper-fork 48, by the traction of spring 172 on the end of lever 23, connecting-rod 50, and shipper 48, and allowed the latter to throw the drawing-in scroll into gear. It is now to be observed that the drawing in of the faller-lock, above described, and the allowing of it to rest upon the stud 74, has, through the builder-lever 75 and grooved pulley 78, which rests on the builder-rail 72, subjected the faller-wire, through the lock 69, to the action of the builder-rail. The lever 75, for this purpose, is pivoted at its rear end to a suitable hanger attached to the under side of the carriage. Simultaneously with the last movement the backward motion of the upper end of the angle-lever 15 has drawn back a bent rod, 80, on the forward end of which, between two collars made fast thereto, is mounted the end of a forked lever, 81, which being attached to a pivoted shipping-rod, 82, whose end embraces the neck of a double-slide clutch on the spindle drum-shaft 3′, has thereby disengaged the gear-clutch 83 from the clutch made fast to the face of the loose gear 8 on the drum-shaft 3′, which said gear 8 meshes with the gear-wheel that is driven by the race-shaft F, and by the same act thrown the saw-clutch gear 84 into gear with the winding-clutch 85, which is also loosely mounted on the drum-shaft 3′. The double-slide clutch 83 and 84 is connected with the drum-shaft by means of a spline, and suitable grooves cut in the shaft and in the sleeve which carries the two. To the side of the winding-clutch 85 is secured, in any suitable manner, a chain-gear, 86, over which, and over another chain-gear, 88, secured to the side of a spur-gear, 89, that meshes with a driving-gear, 90, passes an endless chain, 87, the gear 90 being mounted on the same shaft as gear 7 that drives gear 8 of the drum-shaft 3′. The teeth of gear 90 engage with the teeth of a slide rack-bar, 91, mounted on the side of the center rail s that supports the carriage, for which latter purpose grooved supporting-wheels q are mounted in suitable bearings in a frame, r, secured to the front and rear side of the carriage, and resting on the center rail s. The slide rack-bar 91 is supported on friction-rolls 92, which are mounted in bearings secured to the side of the center rail s, and carries a supplemental or guide rail, 93, suitably secured to its side, and provided on its under side with a flange, between which and the under side of the rack-bar the friction-rolls play. The object of this guide-rail is simply to retain the rack-bar in place while leaving it free to slide back and forth as impelled by the action of the connecting-rod 94 of the quadrant radial arm. The connecting-rod 94 is pivoted at one end on the side, and at or near the center of the slide rack-bar 91, and at the other end to a wrist-pin, 95, made fast to the side of a traveling-nut, 96, which is mounted on the quadrant-screw 97, and slides back and forth on the edges of the quadrant radial arm 98, it being provided with clasp ends for this purpose. On the lower end of the quadrant-screw 97 is secured a bevel-pinion, 99, through which motion is imparted to the screw. This pinion receives motion from a bevel-gear, 100, the shaft 102 of which has its bearings in a sleeve, 101, made fast to the side of the center rail s. This shaft 102 carries on its outer end a saw-clutch gear, 103, and is connected therewith by means of a spline, and suitable grooves cut in the sleeve of the clutch and in the shaft, so that it is free to be moved, as occasion requires, along the line of the shaft for a purpose shortly to be described. Upon the same shaft, 102, between the sleeve-bearing or collar 101 and the clutch-gear 103, is loosely mounted a chain-gear, 104, which is either formed on or made fast to the other half, 105, of the clutch-gear 103. To the lower part of the frame, on the inner side of the clutch-gear 103, is secured a standard, 106, on the upper end of which is mounted a forked shipper, 107, the forked end of which embraces the hub of the saw-clutch 103. The forked shipper carries an arm, 108, near the outer end of which is pierced a hole, through which is passed the end of a slide friction-rod, 109, which is supported at each end in bearings 110, made fast to the side of the center rail s. On the forward end of this rod, on the outside of its support 110, is arranged a spring, 111. A small pin is passed through the outer end of the rod to form the outer bearing of the spring, while its inner end is made to abut against the support 110. On the under side of the carriage is secured a hanger, 112, on the lower end of which is formed a traveling supporting-bearing for the middle portion of the slide friction-rod 109. To the side of this hanger, immediately above the friction-rod, is pivoted a bent lever, 113, the forward end of which is connected by a chain, 114, to a lever, 115, keyed fast to the under faller-rod 116 on the upper carriage-frame. The lever 113 carries an adjustable weight, 117, on its forward end. Near the pivotal point of lever 113, and on its lower edge, is formed a small projection, 118, for a purpose shortly to be described.

Reverting again to the quadrant-movements, it will be seen that my movement differs from the ordinary quadrant movement in having a full half-revolution imparted to the so-called quadrant radial arm instead of a quarter revolution. This is imparted to the arm 98 by means of a half-gear, 119, which is made fast to the rock-shaft 120 of the radial arm, and which is driven by means of an intermediate gear, 121, and a pinion, 122, secured on the shaft 123 of the outer chain-gear 124, around which the chain 1, that drags the carriage in and out, is made to pass, and in so doing, according to the direction in which it is moving, turns the quadrant toward or from the rack-bar 91. The same movement of chain 1 causes the chain-gear 104, with which it also meshes when in gear with the saw-clutch 103, to impart motion to the sliding nut of the radial arm through the screw 97, bevel-gear 100, and pinion 99.

Having now described the devices, and their relation to each other, which regulate the speed of the spindles in winding the thread on the cops, I will now proceed to describe that portion of the mechanism which enables the faller in connection therewith to lay the thread evenly and regularly layer upon layer from the bottom to the top of the cop, and technically called the "cop-builder." This consists of a rail, 72, formed in two parts, and so connected or hinged to each other as to be capable of motion in a vertical plane, the two parts of the rail thus connected being supported by pins or slide-bearings $u$ upon three inclines, $v$, the inclined faces of which are set at the same angle to, and height above, a horizontal plane. The two end ones are inclined from end to end, while the middle one at the end of the incline is provided with a prolongation, $t$, in a horizontal plane for a purpose to be shortly described. Upon the middle one rests the slide-bearing that supports the jointed portion of the builder-rail. Upon this rail is arranged the grooved wheel 78 that supports the builder-lever 75, which operates the faller-lock. To prevent end movement in the builder-rail 72, a standard, $w$, is secured to the bottom of the builder-frame, the upper end of which takes into notches formed in guide $x$, made fast to the side of the builder-rail, thus leaving the latter free to rise and fall, but not to move endwise. The inclines $v$ are arranged to slide in a guideway made fast to the bottom of the frame of the machine, and are connected together by means of a rod, $y$, secured to their side in any suitable manner. To the side of the front incline $v$ is secured a screw-nut, into which a stationary screw-rod, $z$, takes, the outer end of which is provided with a thumb-lever or crank, and is supported in bearings formed in a standard arranged on and secured to the bed of the frame of the cop-builder a little in advance of the front incline.

The inclines $v$, thus connected through the screw-rod $y$, are adjusted simultaneously for the proper performance of the work, and in the following manner: The twist having been thrown in, and the backing-off operation having been performed, and a set of fresh cops about to be filled—the empty cops for this purpose being supposed to be in place on the spindles—the screw-rod $z$ is now turned so as to force the inclines under the rail until the middle slide-support $u$ of the latter stands at the outer end of the level part of the middle incline, and which will have brought the middle and outer ends of the builder-rail to a nearly, but not quite, horizontal position.

It is here to be remembered that the finishing of the backing-off operation has, as before described, drawn the faller-wire down to its proper position ready to commence the building of the cop, and has thrown the saw-clutch 84 into gear with the winding-clutch 85, which is fast to the chain-gear 86 that drives the spindles through the action of the chain 87, chain-gear 88, spur-wheel 89, driving-gear 90, and rack 91, as the carriage is made to move back by the drag of the drawing-in scroll. At this stage, also, the traveling nut 96 of the quadrant-screw 97 must be at the lower end of the screw.

In this condition the machine is ready to commence winding on the bottom of the cop, and the carriage being started in, the spindles commence turning with a uniform motion, winding the first layer of thread immediately around the shaft of the cop, commencing for this purpose at a point, say, about five-eighths or three-quarters of an inch from the head of the bobbin and winding it toward the head of the latter. This operation continues until, by the regular descent of the faller-wire, the last layer has been brought in contact with the head of the bobbin, and which will have been effected by the gradual rise of the faller-lock as the supporting-wheel of the builder-lever ascends the slight incline of the front half of the builder-rail and reaches the point of the opposite incline or rear half of that rail, when, as the wheel 78 descends, it allows the builder-lock also to descend, carrying with it the faller-wire, so as gradually to wind the thread around the bobbin-shaft in an upward direction until it is stopped by the automatic stoppage of the carriage at the end of its inward movement by means which will hereafter be described. A new stretch is then spun in the same manner as before and the different processes performed preparatory to winding up the second stretch; but here it is necessary to refer to other devices connected with the screw that operates the builder-inclines in order to explain the mode of winding the thread to fill the bobbin-head.

I have heretofore stated that, in adjusting the machine to commence winding on a set of empty bobbins, the screw-rod $z$ that adjusted the inclines might be operated by a hand-crank on its end; but, in addition to this, the screw-rod carries, in practice, a ratchet-pinion, which is made to perform a partial revolution each time the faller has been depressed and raised by the action of a double dog, which movement will have caused the screw-rod to withdraw the inclines from beneath the supporting-pins of the builder-rail for a distance equal to the thickness of a layer of thread, thus gradually lowering the lock and enabling the faller-wire to increase its range to that extent. Motion for this purpose is imparted through the dog to the ratchet by means of the cord or chain 24, which is attached to the shipping-rod 20 and to the end of the easing-up rod 25, and which for this purpose is connected to the double dog in the usual manner. This change is automatically effected at the end of each outward stretch of the carriage through the depression of the crank-lever 23 of the shipping-rod 20 and angle-lever 15 of the carriage, so that each layer on the shaft of the bobbin will be increased in length by the thickness of a thread for each stretch of the carriage until the bobbin-head has been filled, after which it will remain uniform in length until the bobbin itself has been filled, and which is effected in the following manner: By reference to Fig. 7 it will be seen that the middle incline $v$ differs from the outer inclines in having a portion, $t$, of its face in a perfectly horizontal plane. This level part during the filling of the bobbin-head has hitherto supported the jointed portion of the rail $v$ on the same level, while the two ends were inclined in opposite directions therefrom. Now, however, that the head has been filled by operation of the screw, the level portion $t$ of that incline will have been withdrawn from underneath the joint supports of the rail, and will have brought the inclined portion of the middle incline under the latter, so that, the inclined faces of all now being the same, the descent of the builder-rail from that time onward until the cop has been filled throughout its entire length will preserve the same angle of the two ends of the rail with respect to the joint during the remainder of the operation, thereby imparting from that time on to the faller through the faller-lock an uniform throw up and down until the cop has been filled.

In order to complete the description of the operation of winding the yarn upon the bobbins or cops, it becomes necessary again to refer to other movements which have been going on simultaneously with those just described. These are imparted by the devices used for communicating motion to the spindles for the winding of the yarn on the cops, for it must be remembered that the motion of the race-shaft, so far as the direct action of the driving-pulleys is concerned, has now ceased, and, consequently, motion from a new source must be imparted to it, and this of such a character as to turn the spindles at a comparatively fast rate of speed when the bobbins are first put on to be filled, but with a gradually-slowing motion, until the lower part of the bobbin has been filled out flush with its head or end, after which, until the bobbin-head has been entirely filled out, a uniformly slow and fast motion is communicated—that is to say, slow when the faller is winding the layer of yarn near the outer edge of the bobbin, and uniformly faster and faster as the layer being wound nears its center, and vice versa. This is effected in the following manner: It being remembered that the traveling-nut 96 of the screw 97, on which the end of the connecting-rod 94 is mounted, is arranged at the commencement of the empty bobbin at the lower end of that screw, so that the pivotal point of the connecting-rod shall be in a line with the shaft 102 of the radial arm 98 and half-gear 119, and that the radial arm 98 must be in a horizontal plane with its head projecting toward the front of the machine or directly opposite to that of the position of the slide-rack 91. In this position the traveling-nut 96 remains until the first layer of the thread has been wound around the bobbin, and the faller-wire has reached the limit of its descent and has again commenced to rise to wind the second layer.

Now, as the second layer is necessarily at a greater distance from the center of the bobbin than the first, it consequently requires a greater length of yarn to perform the circuit. Hence, were the spindles now to turn with the same speed as before, while the motion of the carriage remained the same, it will be obvious that such would create a strong tension on the thread and great pressure on the under-faller wire, and thereby press the latter down, and in so doing allow the chain 114 and weighted lever 113 to drop with its lower projection 118 bearing tightly on the friction-rod 109, thereby clamping the latter and dragging it along with the carriage 2, and in so doing, through a small pin, 126, attached thereto immediately in front of the lever 108 that operates the forked shipper 107 of the saw-clutch 103, cause the shipper to throw the latter into gear with its other half 105, in order to impart motion to the shaft 102 that drives the bevel-gear 100, that turns the pinion 99, that operates the quadrant-screw 97, and thereby raises the traveling-nut 96 for a distance sufficient, through the additional throw of the connecting-rod 94, to lessen the tension of the thread on the under faller; and by that act again raising the lever 113 that clamped the rod 109, which threw the clutch 103 and 105 into gear in order to raise the traveling-nut. This raising of the traveling-nut on the quadrant-screw has the effect of causing the slide rack-bar through the rod 94 to slide inward with a gradual motion toward the head-stock, and in the direction of the movement of the traveling-carriage, and consequently to the extent of that motion, because moving in the direction of the rack-gear 90, that operates the spindle-drum, lessens the velocity of the spindles, and consequently slackens the strain on the thread being wound. The moment this strain has been removed the pressure on the under-faller wire is also removed, when, through the action of the usual weight attached to the shaft of said under-faller rod 116, the latter turns, thereby raising its wire to its normal position, and in so doing again raises the weighted lever 113, and releases the friction-rod 109 from the pressure of projection 118; and at the same time allows the spiral spring 111 to immediately drag the rod 109 backward, and in so doing throw the clutch 103 out of gear with its other half, 105, by the action of its pin 125 on the end of the lever 108 that operates the forked shipper 107, thereby stopping the motion of the bevel-gears that operate the quadrant-screw, and the further rise of the traveling-nut 96 on the same. This condition of things remains until the carriage has reached the end of its backward motion, and again performed its next outward spinning-stretch, and the easing-up and backing-off operations have been again performed, and which will have again, through the action of the chain 1, chain-gear 124, shaft 123, and pinions 122 and 121 turned the half gear 119, and with it the radial arm 98, back to the original horizontal position it occupied when the winding of the yarn on the cop was first commenced, ready again to impart the necessary compensating motion to the spindles on the winding of the succeeding layer; but as the winding of the next layer, like the last, takes place at an increased distance from the center of the bobbin, and consequently, as before, requires more thread to make the round of the bobbin, in order to prevent unnecessary strain on the thread, and the motion of the carriage throughout its backward movement remains constant, the motion of the spindles must again be diminished accordingly as soon as the carriage starts backward. This is effected in the same manner as that last described, and that simply by the increased strain of the thread on the under faller, which, being thereby dragged down, throws into gear the devices just mentioned, that raise the traveling-nut on the quadrant-screw, and that for a distance sufficient to release the strain of the thread on the under faller, and so on until the entire bobbin-head has been filled, the nut being raised for a short distance each time, after which it remains constant or stationary until the cop has been filled to the top, as after that time no increased thickness or additional external layer is wound on the cop.

When the cops are filled, doffed, and new ones substituted therefor, the traveling-nut 96, by means of a crank on the upper end of the quadrant-screw, is turned by the operator down to the lower end of the latter, so as to bring the pivotal pin of the rod 94 again in a line with the shaft of the quadrant radial arm, so as to be ready to commence the filling of the next set of empty cops in the same manner as just described.

Here it may be observed with regard to the raising of the traveling-nut, that the higher it is raised the greater will be the throw of the slide-rack, to which it is connected by means of the connecting-rod 94, and consequently the greater the throw of the latter the less the speed of the spindles; and it may also be remarked that when the radial arm first commences to rise, its action on the rod and rack will be but slight, it, however, gradually and regularly increasing in the extent of its throw, as the radial arm reaches an upright position—in other words, increasing the throw of the rack 91 during the time that the outer layers are being wound around the bobbin, or the time at which it is necessary to impart the slowest motion to the spindles. From this point until the quadrant-arm has been depressed to a horizontal position on the side of the shaft next the rack, the motion of the latter has just been the reverse—that is to say, so as to impart a gradually faster and faster motion to the spindles, and slower and slower motion to the rack, in order to compensate for the diminishing diameter of the layers as they draw nearer and nearer to the bobbin-shaft.

While the regulating of the motion of the spindles during the filling up of the bobbin-head has thus being going on, the gradual lengthening of each of the layers will have also been going on, and this, as before stated, has been accomplished by increasing the length of the throw of the upper faller wire, which is effected by retaining the jointed portion of the builder-rail upon the horizontal portion $t$ of the middle incline $v$, while gradually lowering the outer ends of said rail, by the gradual withdrawal of the outer inclines from beneath their supporting-pins, until the bobbin-head has been entirely filled, at which time the level part of the middle incline will have been entirely withdrawn, and the supporting-pins of the jointed portion of the rail will then be made to rest on its inclined face, which, having the same inclination as that of the two outer inclines, their descent will then be regular and uniform, and hence imparting a throw of uniform extent to the faller until the cop has been filled to the top. The traveling-nut, for the same reason, now also remains stationary, so as to impart a uniformly faster and faster and slower and slower motion to the spindles, as the nature of the unfinished winding operation requires.

We now approach the next operation to be described, and which has reference to the automatic stoppage of the carriage, when the winding operation of the thread then spun has been performed, and the preparation of the machine for spinning the next stretch. As the carriage nears the end of its inward movement, the stud 38 on the under side of the carriage-frame is brought in contact with a tappet formed on or otherwise secured to the upper side of a rack-gear, 128, causing the latter to turn and drag backward with it the hollow shipper-rod 40, by means of the rack 129 secured to the side of the latter, thereby forcing, through the arm 40, the lower end of the slotted lever 42 backward, thus disengaging the slide-pin 46 on the face of the gear of the pinion L from the inclined stop 45 on the inner face of the slotted lever 42, and thereby allowing the cam-shaft M to perform a half-revolution, so as to withdraw the depression in the rim of the cam N from the pin $m'$ of the shipper-fork 48, and by that act force the lower part of that lever inward, and the upper part outward, disengaging the clutch 49 of the drawing-in scroll X from its other half, and thereby stopping further backward drag of the carriage.

The same motion to the cam-shaft M that, through the cam N, threw the drawing-in scroll out of gear, has thrown the drawing-out scroll into gear with its operating mechanism, in the manner heretofore described, in order to drag the carriage outward to spin a new stretch. The same movement of the shaft M has, through a cam, 130, secured on its end next the cam O, acting on a cam-stud, 131, secured to the side of the lifter 132, on the upper end of which one end of the lever 133, that carries the roving-gear, is pivoted, caused the lifter, as the latter is raised, to raise that end of the lever 132 which is attached to it, and to depress the other end that carries the roving-gear, thereby forcing the latter to mesh with the screw-gear $a$, through which it receives its motion in order to regulate the length of roving to be delivered. As soon as the lifter 132 has been raised in order to throw the roving-gear V into gear, a slide-latch, 134, by means of a spiral spring, 137, is thrust under a seat secured to the side of the head of the lifter, thereby holding it in place until the roving-gear is released, as before described. On the other end of the shaft M is secured another cam, 135, similar to cam 130, which, through another stud-cam, 136, secured to the lower end of the lifter 52, has also raised the latter, and that end of the twist-gear lever 138 attached to it, thereby throwing the twist-gear V into gear with the screw-gear $v$ that operates it, and at the same time has thrown the driving-belt from the pulley G upon the main driving-pulley C by means of the lever 53 and slide-shipper 54, thereby making all the changes necessary for spinning the next stretch.

I will now proceed to describe my new arrangement of the squaring-bands, by means of which the carriage is kept even and square while being drawn in and out.

In most of the old arrangements the squaring-band pulley rotates in a horizontal plane, thereby bringing the band some ten or twelve inches above the rails that form the carriageway, and consequently placing them in the way of the operator in attending to his duties about the machine.

By my arrangement the band-wheels 139 rotate in a vertical plane, suitable bearings for their support being provided in hangers 140 secured to the frame 141 of the supporting-wheels 142 of the carriage. These band-wheels are provided on their face with a double groove, around which the bands are made to pass. Immediately above each of these band-wheels are arranged two horizontal carrying-pulleys, 143, having their bearings on studs secured to the frame 141.

On the inside of the rails 144 that support the carriage are secured stud-pins 145, to which are secured the ends of the squaring-bands 146 and 147 in the following manner: The band 146 on the left-hand side of the carriage is attached to the pin at the forward end of the rail, and is then passed around from the under side on the outer groove of the squaring-pulley 139, and thence around the front carrying-pulley 143, and thence along underneath the carriage to its other end, around the rear carrying-pulley arranged there, thence over and around the other squaring-pulley 139 in its outer groove, and thence under and backward to the pin 145 secured on the inside of the right-hand rail at its rear end, or the end next the head-stock. The other squaring-band is first attached to the pin 145 at the front end of the right-hand rail, thence around the squaring-pulley from its under side in the inside groove, thence around the forward carrying-pulley 143 of that wheel, thence around the rear carrier-pulley of the other squaring-band pulley, and from there over and under around the latter, and thence backward to the pin 145, secured to the inside of the rear end of the left-hand rail 144.

By this arrangement the squaring-bands, as they run from end to end of the rails 144, are made to run in a plane below the upper edge of these rails, and entirely out of the way of the operator.

I will now proceed to describe my improved construction of the roving-frame and its delivery-rolls, and also that of the carriage, by means of which, for convenience of transportation and close packing, (they otherwise being of an unwieldy length and weight,) they can be readily taken apart and put together in sections.

The roving-frame consists of a series of standards, 148, each carrying an adjustable samson, 149, for carrying the operative parts of the roving-machinery. These standards are firmly connected and bolted together by means of connecting-tubes 150. The two center standards and samsons are first firmly bolted or secured to the frame of the machine, and thus made parts of the head-stock. They are then connected together by means of short tubes 150, which are then inserted between them, and secured firmly thereto by a screw-rod, 151, which, for the center standards, is passed through both standards and the tube 150. The rod 151 has a screw cut on each end of it, and each of which is made to project beyond the standards, and to pass half-way into a long nut, 152, on the outside of these standards, thus binding these two firmly together. Another sectional screw-rod is then screwed fast into the other half of each of these two long nuts, and another sectional tube, 150, passed over each of these, and another standard and samson for each of these then put up and firmly bolted to the floor; and another long screw-nut, 152, then screwed onto that end of the rod which has passed through the samson and standard just put up, as shown in Figs. 15 and 16. Into the remaining half of this nut the end of the next screw-rod is then made fast as before, and other sectional pipes, samsons and standards, bolts and nuts then put on in the same manner as that just described until the required number of sections to complete the machine have been put together. Instead of using sectional tubes 150, screw-rods 151, and long nuts 152, solid connecting-rods may be used, in which the one end will be turned down, and provided with a male screw, and the other end with a female screw, so that by inserting the male screw of the one into the female screw of the other, the standards may be bolted together as before; but the first mode I deem the better of the two.

In other respects, so far as the shafts of the roving-drums and the lower delivery roll or rolls are concerned, no change is required from that of the ordinary machine, they being coupled together in the usual manner, except that they are made in short sections, to suit the sectional construction of the frame. By being so constructed, each section or combination of sections is made a perfect machine in itself, as each of the samsons carries the bearings of its own operative parts.

Thus made, the machine may be provided with the ordinary delivery-rolls, under as well as upper; but in my improved machine I propose to dispense with one of the under rolls, and to use hinged or pivoted upper rolls instead of the ordinary loose ones, by means of which the operator can more readily get at his roving-strands to piece or otherwise adjust them, and that without fear of misplacing or losing any of the top rolls, and at the same time give him the free use of his hands. The under delivery-roll, 153, may be arranged, coupled, and driven as in other machines of the class, only differing in that there is but one instead of two; the second, by my present mode of supporting the upper rolls, being rendered unnecessary. The upper roll, 154, is connected in pairs by means of a common bearing secured to the forward end of a pivoted lift-lever, 155, whose other end is mounted loosely on a shaft, 156, having its bearings in the frame samsons, they being held in their proper positions by the interposition of loose sleeves mounted on the same shaft, and interposed between each set of rolls. Ordinarily each section will carry from nine to twelve sets of these rolls and lift-levers; but as many may be used as may be deemed advantageous. The shaft 156 is made removable, and has the usual roving-guide rod 157 arranged immediately in its rear, and which also serves as a support for the upper rolls when thrown back by the operatives in attending to their roving. The convenience of such an arrangement for the upper rolls from what has been said must be apparent. The upper end of each samson 149 is provided with a forked standard, 158, each finger of which carries a bearing, for the support of additional full roving-spools, each section being thereby enabled to carry two instead of one extra spool, as in other machines, while the lower end of the same spool-frame on its rear side is provided with an outwardly and upwardly curving projection, which forms a bearing, 159, for empty spools—a very great convenience for the operative.

The carriage, like the roving-frames, is also made in sections, so that it can be readily taken apart and put together again. This I effect by making its internal frame-work in sections, each section 160 being cast in one piece, and provided with suitable standards for the bearing-supports of the spindle drum-shaft 3', and with suitable lugs and flanges, to which to secure the top, front, and back boards, all of which are made easily removable from said sectional frame by being fastened thereto with screws. Each of these frames is so arranged as to correspond with a sectional standard and samson of the roving-frame—that is to say, is like those equidistant apart. To the front side of the carriage, and bolted firmly to said sectional frames 160 after the front board has been secured to the latter, is bolted or screwed the frame 161, that carries the standards 162, that support the faller-shafts 116 and 71, and which standards may be made adjustable by means of slots in the ordinary way. The frame 161, at its upper and lower ends, is provided with flanges for the support of the step and bolster rails 163 and 164 of the spindles 10, both of which, by this means, are made sectional and removable, thereby enabling the operator to remove and adjust the spindles of each section independently of any other, and which heretofore could only be effected by removing the step-rail of the whole carriage. Thus constructed, the carriage can be taken apart and put together again in a very short time, for any purpose whatsoever, whenever required. In the front edge of the spindle-bolster rail 164 is secured the bolster 166, that carries the spindle-bearings 167. This bolster is cast in sections with bearings in sets for two or more spindles, as may be deemed advisable. In the drawing, Figs. 12 and 13, it is represented as being cast in sets of four, each having bearings 167 for four spindles, and is cast hollow between each pair of bearings, as shown in Figs. 13 and 14, said hollow spaces 168 constituting an oil-chamber for lubricating the bearings of the spindles arranged at its ends. This chamber is formed with a slot, 169, near its top and front side, through which it is packed with cotton wicking or other suitable material, by which to facilitate the lubrication of the bearings, a hole or slot, 170, for this latter purpose, being drilled through the bearing at its upper end, between the chamber 168 and the bearings. Between each pair of lubricating-chambers a screw-hole is made in the wall of the bolster, by which it is fastened to the spindle-bolster-rail 164; or, instead of using a removable rail, the bolster may be secured directly to the spindle-rail or front top board of the carriage. This construction of the lubricating-chambers of the bolster enables the spindles to be run a long time without special attention. On the inner face of the door, at its upper edge, is secured a stay-piece, 171, for the purpose of holding the spindles in place, constituting the outer half, as it were, of the bearing.

It will be obvious to practical spinners and manufacturers of spinning-machinery, that the most, if not all, of my improvements, can be applied as well to machinery for spinning thread from any and all kinds of new material as to machinery for spinning yarn, and therefore I do not deem their use in such connection as unprotected by this patent, as I claim them wherever used for the purposes herein set forth.

Having described my improvements, what I claim as new, and desire to secure by Letters Patent, is—

1. The race-shaft F, traveling-gear 4, main shaft B, pulley C, and driving-gears D and E, in combination with the drawing out and in scrolls W and W′ and X and X′, chain 1, shaft y, and carriage 2, when connected and operating in the manner and for the purposes set forth.

2. The race-shaft F and traveling-gear 4, shaft 6, pinion 5, gears 7 and 8, and spindle-drum 3, in combination with chain-gears 86 and 88, chain 87, and gears 89 and 90, for the purposes set forth.

3. The combination of the drawing-out scroll W and its counter-scroll W′ with their connecting-chain or cord p, arranged to operate as and for the purpose set forth.

4. The combination of the drawing-in scroll X and its counter-scroll X′ with their connecting chain or cord, p, arranged to operate as and for the purpose set forth.

5. The combination of the main shaft B, pulley C, and carriage 2, with the shafts K and Y, drawing-out scrolls W and W′, drawing-in scrolls X and X′, gears Z and 124, and chain 1, all operating substantially as described, and for the purposes set forth.

6. The combination of the main driver C, shaft B, pinions n and o, gear P, clutches f and g, and drawing-out scrolls W and W′, shafts K, Y, and 123, chain-gears Z and 124, chain 1, and carriage 2, the whole operating substantially as described, and for the purpose set forth.

7. The loose pulley G, main shaft B, gears H and J, shaft K, clutch 49, and drawing-in scrolls X and X′, arranged and combined with the shafts Y and 123, chain-gears Z and 124, chain 1, and carriage 2, as and for the purpose set forth.

8. The combination of the chain-gear Z, shaft Y, and scrolls W and W′ and X X′, with the chain 1, chain-gear 124, shaft 123, pinion 122, and carriage 2, arranged and operating as and for the purposes set forth.

9. The drawing in and out scrolls W and X, mounted as described upon their shaft—that is to say, by means of a sleeve, c, through the interposition of a leather packing, d, and a screw-nut, e, for the purpose set forth.

10. The shaft T, screw-gear a, roving-gear U, lever 133, slide-latch 134, spring 137, lifters 132, and cam-stud 131, in combination with the shaft M and cam 130, substantially as described, and for the purposes set forth.

11. The shaft T, screw-gear b, twist-gear V, lever 138, slide-latch 51, spring 137, lifter 52, and cam-stud 136, in combination with the shaft M and cam 135, substantially as described, and for the purposes set forth.

12. The shaft M, cam 135, cam-stud 136, lifter 52, lever 138, and slide-latch 51, in combination with the arm 53, slide-shipper 54, and spring 55, for the purposes set forth.

13. The shaft M, cams 130 and 135, cam-studs 131 and 136, lifters 132 and 52, levers 133 and 138, and the roving and twist gears U and V, in combination with the screw-gears a and b and shaft T, lever 53, slide-shipper 54, driving-belt, loose pulley G, and main driving-pulley C, substantially as described, and for the purposes set forth.

14. The combination of the cam 38 on the under side of the carriage and tappet-pinions 39 and 128 with the racks 127 and 129, hollow shipper-rod 40, arm 41, slotted lever 42, male friction-cone 43, female slide-gear L, spring 47, inclines 45, slide stop-pin 46, shaft M, cam O, shipper-fork i, pin m, clutch f, and drawing-out scroll W, substantially as described, for the purposes set forth.

15. The combination of the cam 38 on the under side of the carriage and tappet-pinions 39 and 128 with the racks 127 and 129, hollow shipper-rod 40, arm 41, slotted lever 42, male friction-cone 43, female slide-gear L, spring 47, inclines 45, slide stop-pin 46, shaft M, cam N, shipper-fork 48, clutch 49, and drawing-in scroll X, substantially as described, for the purposes set forth.

16. The combination of the main shipping-rod 20, collar 22, lever 23, and connecting-rod 50 with shipper-fork 48 and drawing-in scroll X, for the purpose set forth.

17. The combination of the angle-lever 15, main shipping-rod 20, and collar 22 with the easing-up rod 25, spiral spring 26, and forked latch-piece 29, for the purpose of throwing the easing-up mechanism in and out of gear, substantially as described.

18. The combination of the hook lift-rod 31, shaft M, and cam-pin 32 with the forked latch-piece 29, for the purpose set forth.

19. The combination of the forked latch-piece 29, head-rest and friction-roll 27, and spring 26 with the easing-up lever 28, worm-gear 35, screw-gear 36, and race-shaft F, substantially as described, and for the purpose set forth.

20. The combination of the chain 1, chain-gear 37, screw-gear 36, and race-shaft F with worm-gear 35, as described, and for the purpose set forth.

21. The combination of worm-gear 35, screw-gear 36, race-shaft F, and slide-gear 4 with the mechanism described, that drives the spindles, as and for the purposes set forth.

22. The combination of the friction-gear 65 and male friction-cone 66 with the main shaft B, bevel-gears E and D, and race-shaft F, whereby the motion of the spindles is reversed for the purpose of performing the backing-off operation, substantially as described.

23. The combination of the twist-gear V, latch 51, lifter 52, lever 138, arm 53, belt-shipper 54, spring 55, and loose pulley G with the inclined arm 56, angle-lever 57, worm-pinion 58, screw-gear 59, rock-shaft 60, arm 61, cam-pin 62, slide-lever 63, lever 64, and spring 21, upright shaft and shipper-fork 67, female friction-gear 65, male friction-cone 66, and main shaft B, the whole operating in the manner and for the purposes substantially as set forth.

24. The combination of the angle-lever 15, crank-lever 17, main shipper 20, and spring 21 with lever 64, slide-lever 63, arm 61, rock-shaft 60, worm-pinion 58, screw-gear 59, angle-lever 57, and arm 56 of the twist-gear lifter 52, all arranged to operate as and for the purpose set forth.

25. The combination of the faller-lock 69, operated through the action of the faller-chain 68, quadrant-pulley 70, slide-lever 76, spring 73, and angle-lever 15 with the crank-lever 17 and main shipping-rod 20, for the purpose set forth.

26. The combination of the angle-lever 15, operated as described, crank-lever 17, main shipper 20, and spring 172 with lever 23, connecting-rod 50, shipper-fork 48, and drawing-in scroll X, as and for the purposes set forth.

27. The combination of the angle-lever 15, bent connecting-rod 80, forked lever 81, shipper 82, and clutch 83 with drum-gear 8, substantially as described, and for the purpose set forth.

28. The faller-lock 69, connecting-bar 76, and angle-lever 15, in combination with forked lever 81, for the purpose set forth.

29. The clutches 84 and 85, spindle-drum shaft 3', chain-gears 86 and 88, and endless chain 87, in combination with pinion 89, driving-gear 90, and slide-rack 91, substantially as described, whereby motion is imparted to the spindle in winding the yarn on the bobbins, as set forth.

30. In combination with the carriage 2, gear 90, rack 91, chain 1, and chain-gears Z and 124, the drawing-in scrolls X and X', the whole operating in the manner and for the purposes set forth.

31. In combination with the chain 1, chain-gear 124, shaft 123, and pinions 122 and 121, the half-gear 119 and radial arm 98, for the purpose of imparting motion to the compensating devices, which regulate the speed of the spindles while winding the yarn or thread on the bobbins, as set forth.

32. In combination with the arm 98, traveling-nut 96, connecting-rod 94, and slide-rack 91, the gear 90, spur-gear 89, chain-gears 86 and 88, and endless chain 87, substantially as described, and for the purposes set forth.

33. The combination of a rack, 91, with a gear, 90, mounted directly on the carriage 2 of a spinning-machine, whereby motion is imparted to the spindles in winding the yarn on the cops, in the manner substantially as described.

34. A slide-rack, 91, as a means of imparting compensating motion to the spindles in winding the yarn on the cops when used for that purpose, in connection with a gear, 90, directly mounted on the carriage 2 of an automatic spinner, substantially as set forth.

35. In combination with the chain 1, that draws the carriage in and out, the chain-gear 104, shaft 102, bevel-gears 100 and 99, quadrant-screw 97, and traveling-nut 96, arranged as and for the purpose described.

36. The combination of the under faller 116, arm 115, chain or cord 114, weighted lever 113, and projection 118 with the friction-rod 109, forked shipper 107, saw-clutch gears 103, chain-gear 104, and chain 1, all arranged and operating in the manner and for the purposes described.

37. The combination of the drawing-out scrolls W and W', shaft Y, gear Z, chain 1, gear 124, shaft 123, and pinions 122 and 121 with half-gear 119 and radial arm 98, for the purpose set forth.

38. The combination of three inclined slides, v, constructed, arranged, and operated as described, with a jointed builder-rail, 72, for the purpose set forth.

39. In combination with the jointed builder-rail 72 and inclined slides v, the hinged lever 75, stud-pin 74, and faller-lock 69, substantially as described, and for the purpose set forth.

40. The squaring-band pulleys 139, in combination with the carrier-pulleys 143 and bands 146 and 147, the whole being arranged as described, for the purpose set forth.

41. A removable sectional spindle-step rail, 163, constructed and arranged as and for the purpose set forth.

42. The combination of a series of sectional frames, 160, for the support and attachment of the outer shell of the carriage 2, with a like series of sectional frames, 161, for the support of the faller-standards, and sectional spindle-drums, step-rails, and spindle-collar rails, each being constructed substantially as described, for the purposes set forth.

43. The combination of a series of standards, 148, and samsons 149, for the support of the roving-delivery mechanism, when the same are connected, by means of tubes 150, in short sections, screw-rods 151, and nuts 152, or their equivalents, in the manner substantially as described, and for the purposes set forth.

44. The combination of one or more hinged top rolls 154, with the under delivery-rolls 153, substantially as described, for the purposes set forth.

45. In combination with a standard, 158, for the support of one or more full spools, the rearwardly-projecting arm 159, for the support of the empty spools on exchanging the latter from the roving-drum 173 for full ones, as set forth.

NATHAN W. BANCROFT.

Witnesses:
P. HANNAY,
DONALD G. STUART.